US010462814B2

(12) United States Patent
Zhou et al.

(10) Patent No.: US 10,462,814 B2
(45) Date of Patent: Oct. 29, 2019

(54) METHODS AND APPARATUS FOR SIGNALING ENHANCED DISTRIBUTED CHANNEL ACCESS PARAMETERS FOR SUBSETS OF WIRELESS DEVICES

(71) Applicant: QUALCOMM Incorporated, San Diego, CA (US)

(72) Inventors: Yan Zhou, San Diego, CA (US); Simone Merlin, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/415,727

(22) Filed: Jan. 25, 2017

(65) Prior Publication Data

US 2017/0135129 A1 May 11, 2017

Related U.S. Application Data (63) Continuation of application No. 14/599,951, filed on Jan. 19, 2015, now Pat. No. 9,591,669.

(51) Int. Cl.
*H04W 74/00* (2009.01)
*H04L 12/18* (2006.01)
*H04W 28/18* (2009.01)

(52) U.S. Cl.
CPC ......... *H04W 74/006* (2013.01); *H04L 12/189* (2013.01); *H04W 28/18* (2013.01)

(58) Field of Classification Search
None
See application file for complete search history.

(56) References Cited

U.S. PATENT DOCUMENTS 8,649,322 B2 * 2/2014 Grandhi et al.
8,761,033 B2 6/2014 Abraham et al.
(Continued)

FOREIGN PATENT DOCUMENTS

CN 101433018 A 5/2009
EP 2784946 A1 10/2014
(Continued)

OTHER PUBLICATIONS

International Search Report and Written Opinion—PCT/US2015/012006—ISA/EPO—dated Apr. 29, 2015.
(Continued)

*Primary Examiner* — Michael J Moore, Jr.
(74) *Attorney, Agent, or Firm* — Steven R. Thiel; Qualcomm IP Dept.

(57) ABSTRACT

A method for configuring channel access parameters in a wireless communication system includes selecting an element identification (ID) from a plurality of element IDs. Each of the plurality of element IDs identifies an enhanced distributed channel access (EDCA) parameter set element comprising at least one channel access parameter for at least one subset of wireless devices in a group of wireless devices. The selected element ID is identifiable by wireless devices of the group of wireless devices and not identifiable by other wireless devices. The method further includes generating the EDCA parameter set element for setting the at least one channel access parameter for each wireless device in the at least one subset. The EDCA parameter set element includes the selected element ID. The method further includes transmitting the EDCA parameter set element to at least one wireless device in the at least one subset of wireless devices.

26 Claims, 6 Drawing Sheets

(56) References Cited

U.S. PATENT DOCUMENTS

| | | | |
|---|---|---|---|
| 9,451,636 B2* | 9/2016 | Seok | |
| 9,591,669 B2* | 3/2017 | Zhou et al. | |
| 9,749,936 B2* | 8/2017 | Lee et al. | |
| 9,750,050 B2* | 8/2017 | Ji et al. | |
| 2010/0150116 A1 | 6/2010 | Ji et al. | |
| 2013/0250836 A1* | 9/2013 | Shiotani | |
| 2013/0279427 A1 | 10/2013 | Wentink et al. | |
| 2013/0294354 A1 | 11/2013 | Zhang et al. | |
| 2014/0314054 A1* | 10/2014 | Seok et al. | |
| 2015/0098459 A1 | 4/2015 | Lee et al. | |
| 2015/0208438 A1 | 7/2015 | Zhou et al. | |
| 2015/0249953 A1 | 9/2015 | Kim et al. | |

FOREIGN PATENT DOCUMENTS

| | | |
|---|---|---|
| WO | WO-2011002737 A1 | 1/2011 |
| WO | WO-2013077685 A1 | 5/2013 |

OTHER PUBLICATIONS

European Search Report—EP18167679—Search Authority—The Hague—dated Jul. 3, 2018.
Kawamura K., et al., "Technique for Dynamically Updating EDCA Access Parameters for WLANs", NTT Technical Review, Telecommunications Association, Tokyo, JP vol. 5, No. 11, Nov. 1, 2007 (Nov. 1, 2007), XP002727118, ISSN: 1348-3447 Retrieved from the Internet: URL: https://www.ntt-review.jp/archive/ntttechnical.php?contents=ntr200711sf6.html [retrieved on Jul. 14, 2014], pp. 1-5.

\* cited by examiner

METHODS AND APPARATUS FOR SIGNALING ENHANCED DISTRIBUTED CHANNEL ACCESS PARAMETERS FOR SUBSETS OF WIRELESS DEVICES

CROSS REFERENCE TO RELATED APPLICATIONS

This application is a continuation of U.S. application Ser. No. 14/599,951, titled "METHODS AND APPARATUS FOR SIGNALING ENHANCED DISTRIBUTED CHANNEL ACCESS PARAMETERS FOR SUBSETS OF WIRELESS DEVICES," filed Jan. 19, 2015, which claims the benefit of U.S. Provisional Application No. 61/929,446 titled "METHODS AND APPARATUS FOR SIGNALING ENHANCED DISTRIBUTED CHANNEL ACCESS PARAMETERS BY GROUP OF WIRELESS DEVICES," filed Jan. 20, 2014. The content of these prior applications are considered part of this application and are hereby incorporated by reference in their entirety.

BACKGROUND

Field

The present application relates generally to wireless communications, and more specifically to methods and apparatuses for signaling enhanced distributed channel access parameters for subsets of wireless devices.

Background

Communications networks are used to exchange messages among devices. Wireless networks are often preferred when the network elements are mobile and thus have dynamic connectivity needs, or if the network architecture is formed in an ad hoc, rather than fixed, topology. The devices in a wireless network may transmit/receive information based on channel access protocols such as enhanced distributed channel access (EDCA). EDCA defines separate data traffic access categories, which may include best effort, background, video and voice over wireless local access network (WLAN) (VoWLAN). For example, data traffic associated with transmission or reception of emails may be assigned a low priority class, and VoWLAN may be assigned a high priority class. Utilizing EDCA, high-priority data traffic has more opportunity of being sent than a low-priority data traffic because a station with high priority data traffic waits for less time before sending such a data packet, on average, than a station with low priority data traffic.

Rather than setting of EDCA parameters solely based on the type of data traffic, it may be desirable to set EDCA parameters based on grouping of wireless devices having a particular common capability. Subsets of wireless devices may be selected based on capabilities of the wireless devices in a particular group of wireless devices. However, the current signaling techniques described in various Standards associated with the WLAN 802.11 technology needs improvement for allowing communication of different EDCA parameters for different subsets of wireless devices. For example, the current techniques may include broadcast of an multicast address per EDCA subset element (IE), a single IE identification number (ID) and update count within the IE, and which must be reused by all wireless devices. It is difficult or impossible to set separate EDCA parameters for different subsets of wireless devices in the same wireless network. Moreover, if an IE is multicasted to a plurality of specific wireless devices, additional communication of data frames would be required in the IE, as compared to broadcasting. Also, the current signaling techniques are inadequate for defining multicast addresses per subset of wireless devices. As such, methods and apparatus for signaling enhanced distributed channel access parameters for subsets of wireless devices are needed.

SUMMARY

One aspect of the disclosure provides a method for configuring channel access parameters in a wireless communication system. The method includes selecting an element identification (ID) from a plurality of element IDs, each of the plurality of element IDs identifying an enhanced distributed channel access (EDCA) parameter set element comprising at least one channel access parameter for at least one subset of wireless devices in a group of wireless devices. The selected element ID is identifiable by wireless devices of the group of wireless devices and not identifiable by other wireless devices. The method further includes generating the EDCA parameter set element for setting the at least one channel access parameter for each wireless device in the at least one subset of wireless devices. The EDCA parameter set element includes the selected element ID. The method may further include transmitting the EDCA parameter set element to at least one wireless device in the at least one subset of wireless devices.

Another aspect of the disclosure provides an apparatus for configuring channel access parameters in a wireless communication system, the apparatus comprising at least a processor and a transmitter. The processor is configured to select an element identification (ID) from a plurality of element IDs, each of the plurality of element IDs identifying an EDCA parameter set element comprising at least one channel access parameter for at least one subset of wireless devices in a group of wireless devices. The selected element ID is identifiable by wireless devices of the group of wireless devices and not identifiable by other wireless devices. The processor is also configured to generate the EDCA parameter set element for setting the at least one channel access parameter for each wireless device in the at least one subset of wireless devices. The EDCA parameter set element includes the selected element ID. The transmitter is configured to transmit the EDCA parameter set element to at least one wireless device in the at least one subset of wireless devices.

Another aspect of the disclosure provides a non-transitory computer-readable medium. The medium comprises code that, when executed, causes an apparatus for configuring channel access parameters in a wireless communication system to select an element identification (ID) from a plurality of element IDs. Each of the plurality of element IDs identifies an EDCA parameter set element comprising at least one channel access parameter for at least one subset of wireless devices in a group of wireless devices. The selected element ID is identifiable by wireless devices of the group of wireless devices and not identifiable by other wireless devices. The code, when executed, additionally causes the apparatus to generate the EDCA parameter set element for setting the at least one channel access parameter for each wireless device in the at least one subset of wireless devices. The EDCA parameter set element includes the selected element ID. The code, when executed, additionally causes the apparatus to transmit the EDCA parameter set element to at least one wireless device in the at least one subset of wireless devices.

Another aspect of the disclosure provides an apparatus for configuring channel access parameters in a wireless communication system, the apparatus including means for selecting an element identification (ID) from a plurality of element IDs. Each of the plurality of element IDs identifies an EDCA parameter set element comprising at least one channel access parameter for at least one subset of wireless devices in a group of wireless devices. The selected element ID is identifiable by wireless devices of the group of wireless devices and not identifiable by other wireless devices. The apparatus further includes means for generating the EDCA parameter set element for setting the at least one channel access parameter for each wireless device in the at least one subset of wireless devices. The EDCA parameter set element includes the selected element ID. The apparatus further includes means for transmitting the EDCA parameter set element to at least one wireless device in the at least one subset of wireless devices.

DETAILED DESCRIPTION

Various aspects of the novel apparatuses and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure or functionality than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to wirelessly interconnect devices while employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah, 801.11ac, 802.11n, 802.11g, and/or 802.11b protocols.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, such as 802.11b and/or 802.11g for example, and/or may be used to transmit wireless signals across a relatively long range, for example about one kilometer or longer.

Certain of the devices described herein may further implement Multiple Input Multiple Output (MIMO) technology. This may also be implemented as part of the 802.11ah standard. A MIMO system employs multiple ($N_T$) transmit antennas and multiple ($N_R$) receive antennas for data transmission. In some implementations, a WLAN includes various devices operating for example as access points ("APs") and clients (also referred to as stations, wireless devices or "STAs"). In general, an AP serves as a hub or base station for facilitating wireless communication in the WLAN among a number of STAs. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks or to other STAs. In some implementations an STA may also be used as an AP.

One or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium. Certain devices may be implemented and operated in accordance with the 802.11ah standard and other devices operated in accordance with a different version of an 802.11 standard in such a network, for example.

Figure 1:
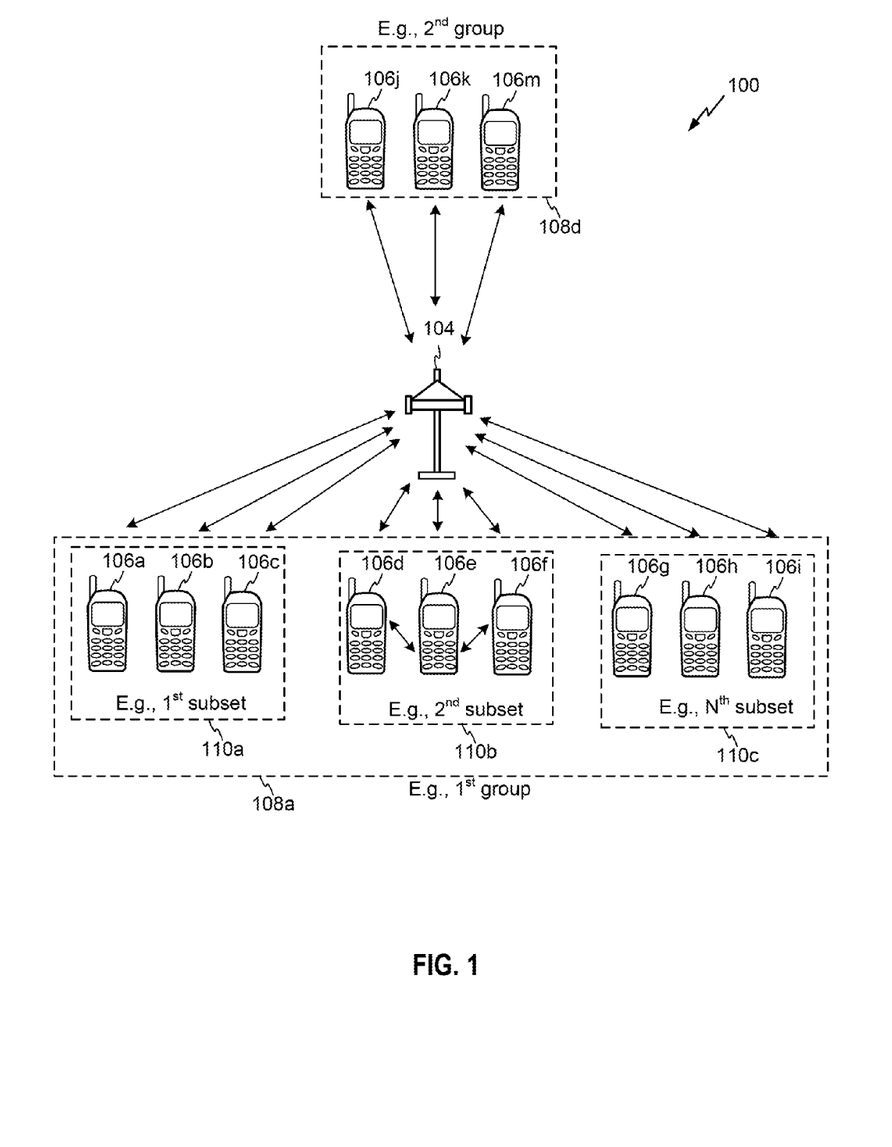
FIG. 1 illustrates an example of a wireless communication system in which aspects of the present disclosure may be employed.

FIG. 1 illustrates an example of a wireless communication system 100 in which aspects of the present disclosure may be employed. The wireless communication system 100 may operate pursuant to a wireless standard, for example at least one or more of the 802.11ah, 802.11ac, 802.11n, 802.11g and 802.11b standards. The wireless communication system 100 may include an AP 104, which communicates with STAs 106a-106m. A variety of processes and methods may be used for transmissions in the wireless communication system 100 between the AP 104 and the STAs 106a-106m. For example, signals may be transmitted and received between the AP 104 and the STAs 106a-106m in accordance with OFDM/OFDMA techniques and/or CDMA techniques. Based on the operation in accordance with a particular 802.11 standard, the wireless devices 106a-106i may be grouped as high efficiency (HE) wireless devices, while the wireless devices 106j-106m may be grouped as legacy wireless devices. For example, the HE wireless devices 106a-106i may be configured to communicate at higher data rates and/or to utilize less energy during communication or operation as compared to the legacy wireless devices 106j-106m. Thus, for the purpose of this disclosure, the wireless devices 106a-106i may be considered part of a first group of wireless devices 108a, while the wireless devices 106j-106m may be considered part of a second group of wireless devices 108d. Further, the wireless devices 106a-106c, 106d-106f, and 106g-106i may each form respective subsets 110a, 110b, and 110c of wireless devices in the first group of wireless devices 108a. The subset of wireless devices 110a (e.g., wireless devices 106a-106c) may comprise HE wireless devices exchanging data traffic with the AP 104, the subset of wireless devices 110b (e.g., the wireless devices 106d-106f) may comprise peer-to-peer (P2P) HE wireless devices exchanging data traffic with one another, and the subset of wireless devices 110c (e.g., the wireless devices 106g-106i) may comprise HE wireless devices sending management frames to the AP 104, such as for example, probe or association request frames. As described herein and in more detail in connection with FIGS. 2-13, EDCA parameters may be set separately for each subset of the first group of wireless devices 108a. In addition, in some implementations, the particular HE wireless devices 106a-106i may form the subsets 110a-110c based on a signal to noise ratio (SNR), or some other performance characteristic. The wireless devices individually or collectively may determine the subsets of the wireless devices based on such characteristics.

The wireless communication system 100 may not have an AP 104, but rather may function as a peer-to-peer network for the wireless devices 106a-106m. Accordingly, the functions of the AP 104 described herein may alternatively be performed by one or more of the wireless devices 106a-106m.

Figure 2:
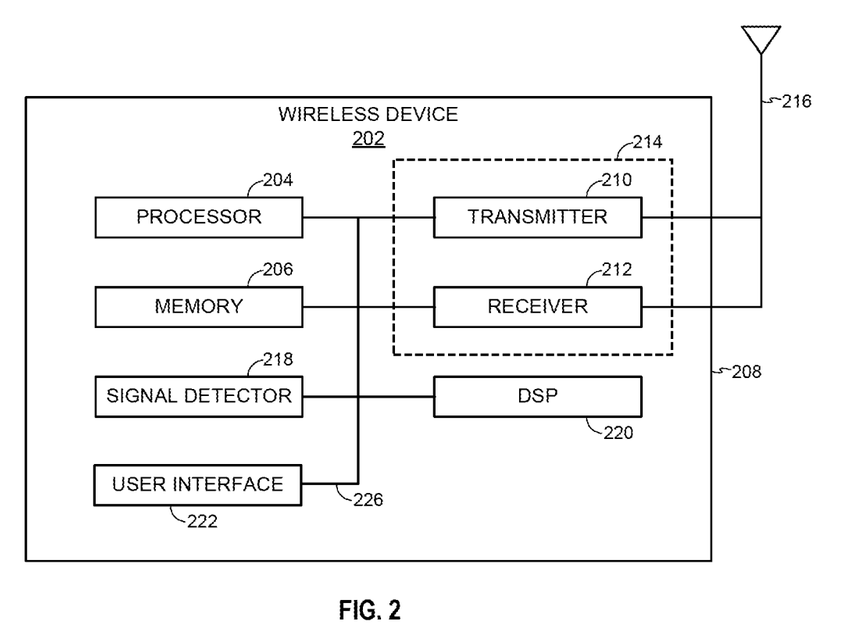
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement various aspects described herein. For example, the wireless device 202 may comprise the AP 104 or any one of the wireless devices 106a-106m.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during MIMO communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The communications exchanged between devices in a wireless network may include data units which may comprise data packets or data frames. In some aspects, the data units may include data frames, control frames, and/or management frames. Data frames may be used for transmitting data from an AP and/or a wireless device to other APs and/or wireless devices. Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

Figure 3:
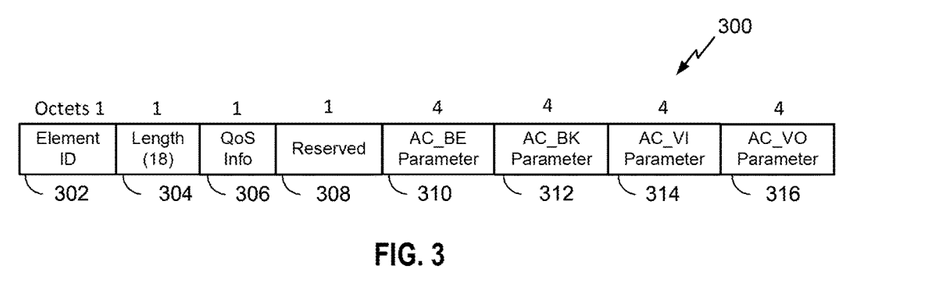
FIG. 3 illustrates an exemplary implementation of an EDCA parameter set element.

FIG. 3 illustrates an exemplary implementation of an EDCA parameter set element 300. The EDCA parameter set element 300 may be transmitted by a wireless device in order to set the EDCA parameters (e.g., channel access parameters) for one or more subsets of wireless devices in a group of wireless devices. The EDCA parameter set element 300 may comprise all or a subset of the following: an element identification (ID) field 302, a length field 304, a quality of service (QoS) information (info) field 306, a reserved field 308, a best effort channel access parameter field 310, a background channel access parameter field 312, a video channel access parameter field 314, and a voice channel access parameter field 316. FIG. 3 further indicates exemplary sizes in octets of each of the fields 302, 304, 306, 308, 310, 312, 314 and 316 as 1, 1, 1, 1, 4, 4, 4, and 4, respectively. Each of the channel access parameter fields 310, 312, 314, and 316 may include channel access parameters specific to the respective type of data traffic. The information in the channel access parameter fields is utilized by any HE wireless device that receives the EDCA parameter set element 300. The HE wireless device is also configured to identify the particular element identification (ID) within the element ID field 302. The QoS info field 306 may include an update count subfield (not shown). An associated wireless device receiving the EDCA parameter set element 300 may determine whether to update EDCA parameters based on the update count indicating a more recent parameters set or adjustment than the currently set EDCA parameters.

The EDCA parameter set element 300 may have the same structure and fields as a legacy EDCA parameter set element with the exception of a selection of an element ID for the element ID field 302. The element ID for the element ID field 302 is selected such that only a particular group of wireless devices (e.g., the first group of wireless devices 108a (HE wireless devices 106a-106i)) could recognize the selected element ID. The second group of wireless devices 108d (legacy wireless devices 106j-106m) in FIG. 1 could not recognize the selected element ID and as such receiving the EDCA parameter set element 300 is ignored, in accordance with an implementation. In another implementation, the selected element ID is recognized by a particular subset of the first group of wireless devices 108a (e.g., one or more of the subsets 110a-110c). The element ID for the element ID 302 may need to be selected such that the second group of wireless devices 108d and one or more subsets 110a-110c of the first group of wireless devices 108a would not be able to either identify, or, if identified, to operate on the identified element ID. As such, receiving the EDCA parameter set element 300 by such devices is ignored.

A plurality of element IDs may be defined. One such element IDs would operate as identifying an EDCA parameter set element 300 comprising channel access parameters for one subset of wireless devices (e.g. wireless device subsets 110a-110c) of a group of wireless devices. Also, other element IDs may be defined for any combination of the wireless device sets 110a-110c. Another such element ID would operate as identifying an EDCA parameter set element 300 comprising channel access parameters for the entire first group of wireless devices 108a (e.g., all three subsets 110a-110c). The selection of the element ID may be carried out according to a predetermined algorithm or standard defining which element ID should be used. The algorithm may also be based on a random selection process, for example.

In reference to FIG. 1, the AP 104 may broadcast the EDCA parameter set element 300 including an element ID in the element ID field 302 corresponding to only subset 110a of the first group of wireless devices 108a, including the HE wireless devices 106a-106c. Because each of the wireless devices 106d-106i in the subsets 110b and 110c of the first group of wireless devices 108a are also HE wireless devices, they may be able to decode and identify the element ID in the element ID field 302, however, resolving that the element ID in the element ID field 302 does not correspond to them. In contrast, the wireless devices 106j-106m in the second group of wireless devices 108d are legacy wireless devices and so will not be capable of identifying the element ID in the element ID field 302, and will discard the received EDCA parameter set element 300. As such, only the subset 110a of the first group of wireless devices 108a (e.g., the wireless devices 106a-106c) will set their EDCA parameters to the values in the EDCA parameter set element 300. The element ID within the element ID field 302 may be configured to correspond to any number of subsets of the first group of wireless devices 108a, and as such, more than one subset of wireless devices may set their EDCA parameters to the values in the commonly received EDCA parameter set element 300.

Figure 4:
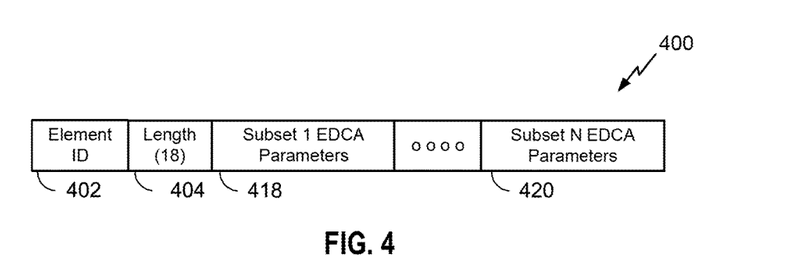
FIG. 4 illustrates another exemplary implementation of an EDCA parameter set element.

FIG. 4 illustrates another exemplary implementation of an EDCA parameter set element 400. The EDCA parameter set element 400 may show only those fields necessary for an understanding of the improvements thereto and so element 400 may include more fields than those shown. Instead of setting EDCA parameters for a single subset of a group of HE wireless devices, as described in connection with EDCA parameter set element 300 of FIG. 3, or a common EDCA parameters for several subsets of a group of HE wireless devices, as described in connection with EDCA parameter set element 300 of FIG. 3, the EDCA parameter set element 400 of FIG. 4 allows the communication and setting of different EDCA parameters for each of the several subsets of a group of HE wireless devices. The EDCA parameter set element 400 includes a channel access parameter field for each of the several subsets of the group of HE wireless devices in a predetermined order in a single transmission of EDCA parameter set element 400. The EDCA parameter set element 400 includes an element ID field 402, a length field 404, a channel access parameter field 418 corresponding to a first subset of a group of wireless devices, a channel access parameter field 420 corresponding to an $N^{th}$ subset of the group of wireless devices, and any number of additional channel access parameter fields (not shown) corresponding to each subset of the group of wireless devices between the first subset and the $N_{th}$ subset. As such, at least two subsets of wireless devices receive their corresponding channel access parameters in one transmission of EDCA parameter set element 400. Each of the first through $N^{th}$ channel access parameter fields may be generated in a predetermined order without an additional need for for signaling the order of the channel access parameter fields.

For example, in reference to FIG. 1, the AP 104 may broadcast the EDCA parameter set element 400 including a selected element ID in the element ID field 402 that is decodable and identifiable by all of the HE wireless devices 106a-106i within subsets 110a, 110b and 110c of the first group of wireless devices 108a. In contrast, the wireless devices 106j-106m in the second group of wireless devices 108d are legacy wireless devices and so will not be capable of identifying the element ID in the element ID field 402. In this case, the EDCA parameter set element 400 includes a plurality of channel access parameter fields: a first subset channel access parameter field 418, a second subset channel access parameter field (not shown), and an $N^{th}$ subset channel access parameter field 420, which in this example, would correspond to a third subset channel access parameter field. Since the plurality of channel access parameter fields are generated in a predetermined order, the HE wireless devices 106a-106c (e.g., subset 110a) may receive the element 400 and read the channel access parameters from the first subset channel access parameter field 418 and update their channel access parameters accordingly. Likewise, the HE wireless devices 106d-106f (e.g., subset 110b) may receive the element 400 and read the channel access parameters from the second subset channel access parameter field (not shown) and update their EDCA parameters accordingly. Similarly, the HE wireless devices 106g-106i (e.g., subset 110c) may receive the element 400 and read the channel access parameters from the $N^{th}$ subset channel access parameter field 420 and update their channel access parameters accordingly. In this way, only the wireless devices 106a-106i will set their channel access parameters to the respective values in the EDCA parameter set element 400. The members of the wireless devices in each subset (e.g. subsets 110a, 110b, 110c) may be determined before transmission of the EDCA parameter set element 400, and may be communicated via other signaling messages.

Figure 5:
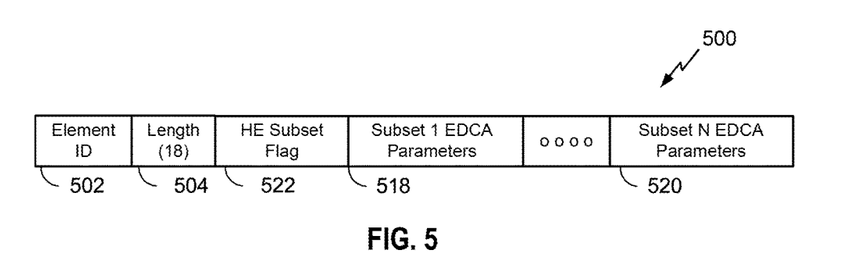
FIG. 5 illustrates another exemplary implementation of an EDCA parameter set element.

FIG. 5 illustrates another exemplary implementation of an EDCA parameter set element 500. The EDCA parameter set element 500 may show only those fields necessary for an understanding of the improvements thereto and so may include more fields than those shown. The EDCA parameter set element 500 may include a length field 504 and the element ID field 502. In a comparison as described in connection with EDCA parameter set element 400 of FIG. 4, the EDCA parameter set element 500 of FIG. 5 includes channel access parameters for subsets of HE wireless devices indicated by an HE subset flag field 522. The HE subset flag field 522 may include multiple flag bits; each of the flag bits indicating the presence of a channel access parameter field corresponding to a particular subset of the HE wireless devices. For example, in one implementation, the HE subset flag field 522 may include three bits, a "1" in any of the bit positions indicating the presence of a channel access parameter field for a subset of HE wireless devices corresponding to the position of that particular bit in the HE subset flag field 522. In this example, if the value is set to "1" for each bit in the HE subset flag field 522, a corresponding channel access parameter field may be provided. An HE wireless device receiving the EDCA parameter set element 500 is able to determine based on the HE subset flag field 522 the subsets of HE wireless devices that have a corresponding EDCA parameter field present in the EDCA parameter set element 500. Thus, the EDCA parameter set element 500 may comprise a plurality of channel access parameter fields (e.g. 518, 520).

For example, in reference to FIG. 1, the AP 104 may broadcast the EDCA parameter set element 500 including an element ID in the element ID field 502 that is decodable and identifiable by all of the HE wireless devices 106a-106i within subsets 110a, 110b and 110c of the first group of wireless devices 108a. The wireless devices 106j-106m in the second group of wireless devices 108d are legacy wireless devices and so will not be capable of identifying the element ID in the element ID field 502. In one example, the HE subset flag field 522 may include the flag bits "110", which may indicate the presence of channel access parameter fields for the subsets 110a and 110b of the first group of wireless devices 108a (e.g., for HE wireless devices 106a-106c and 106d-106f) but not for the subset 110c of first group of wireless devices 108a (e.g., for HE wireless devices 106g-106i). Accordingly, element 500 may also include the first subset channel access parameter field 518, and a second subset channel access parameter field (shown as the $N^{th}$ subset channel access parameter field 520) in this example. Since the channel access parameter fields are generated in a predetermined order and only when a corresponding flag bit in the HE subset flag field 522 is present, the HE wireless devices 106a-106c may receive the element 500 and read the channel access parameters from the first subset channel access parameter field 518 and update their channel access parameters accordingly. Likewise, the HE wireless devices 106d-106f may receive the element 500 and read the channel access parameters from the $N^{th}$ subset channel access parameter field 520 and update their channel access parameters accordingly. However, the HE wireless devices 106g-106i may receive the element 500 but not adjust any channel access parameters because the flag bit within the HE subset flag field 522 corresponding to the subset 110c of first group of wireless devices 108a does not have a value of "1" and so no channel access parameter field is provided in the EDCA parameter set element 500. The wireless devices that do not have a channel access parameter present in the EDCA parameter set element 500 could ignore receiving the portion of the EDCA parameter set element 500 after the HE subset flag field 522.

Figure 6:
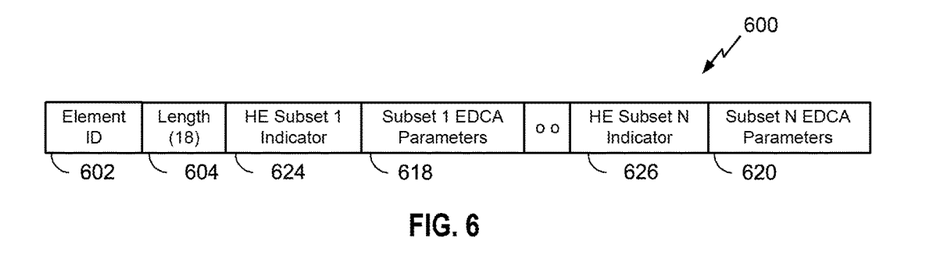
FIG. 6 illustrates another exemplary implementation of an EDCA parameter set element.

FIG. 6 illustrates another exemplary implementation of an EDCA parameter set element 600. The EDCA parameter set element 600 may show only those fields necessary for an understanding of the improvements thereto and so may include more fields than those shown. The EDCA parameter set element 600 includes the length field 604, and the element ID field 602. As described in connection with the EDCA parameter set element 400 of FIG. 4, or in connection with the EDCA parameter set element 500 of FIG. 5, the EDCA parameter set element 600 of FIG. 6 includes and communicate only channel access parameters for the subsets of HE wireless devices separately indicated by a respective HE subset indicator field 624/626 provided immediately before the corresponding channel access parameter field 618/620 for the particular subset. Each HE subset indicator field 624/626 may include multiple bits for indicating the presence of a channel access parameter field corresponding to a particular subset of the first group of wireless devices 108a. For example, in one implementation, the HE subset indicator field 624 may include two bits, "00", for indicating the presence of a channel access parameter field 618 for the subset 110a of the first group of wireless devices 108a (e.g., the wireless devices 106a-106c of FIG. 1). Accordingly, the next field generated in the element 600 would be the first subset channel access parameter field 618 (e.g., corresponding to the wireless devices 106a-106c in the subset 110a of the first group of wireless devices 108a). Likewise, the HE subset indicator field 626 may include two bits, "10", for indicating the presence of a channel access parameter field for the subset 110c of the first group of wireless devices 108a (e.g., the HE wireless devices 106g-106i). Accordingly, the next field provided in the EDCA parameter set element 600 would be the third subset channel access parameter field 620 (e.g., corresponding to the HE wireless devices 106g-106i in the subset 110c of the first group of wireless devices 108a). Thus, the EDCA parameter set element 600 may comprise a plurality of channel access parameter fields 618/620. In another alternative implementation, each HE subset indicator field 624/626 may include multiple bits with each bit position corresponding to a distinct HE wireless device association identification (ID) (i.e., AID). For example, each bit of the HE subset indicator fields 624/626 may be predefined to correspond to a wireless device having a specific AID. In such an implementation, a HE wireless device would be included in a particular subset if the bit corresponding to its AID is set to "1". Thus, a HE wireless device receiving the element 600 will understand which subsets of HE wireless devices will have a corresponding channel access parameter field present based on the HE subset indicator fields present in the element 600. Such an element 600 would provide greater flexibility in that channel access parameter fields may be indicated in any desired order based on the values in the HE subset indicator fields that immediately precede each channel access parameter field.

HE wireless devices may be capable of communicating at a faster rate and/or utilizing less power as compared to legacy wireless devices. For utilizing the advantages of HE wireless devices while minimizing the probability of data collisions with the slower, less efficient legacy wireless devices, the HE wireless devices are allowed to communicate during certain HE-reserved periods of a beacon interval (e.g., during a predetermined time period) and to block the legacy wireless devices from communicating during the same periods. However, blocking the legacy wireless devices from communicating during the HE-reserved periods may unfairly limit the amount of time the legacy wireless devices are allowed to communicate over the same communication medium. Thus, to balance fairness, outside the HE-reserved periods (e.g., outside the predetermined time period) the HE wireless devices may utilize channel access parameters which give the HE wireless devices a lower priority than the legacy wireless devices. For such an arrangement, at least two different sets of channel access parameters (e.g., inside channel access parameters and outside channel access parameters within respective inside channel access parameter fields and outside channel access parameter fields) may be utilized for each subset of HE wireless devices.

Figure 7:
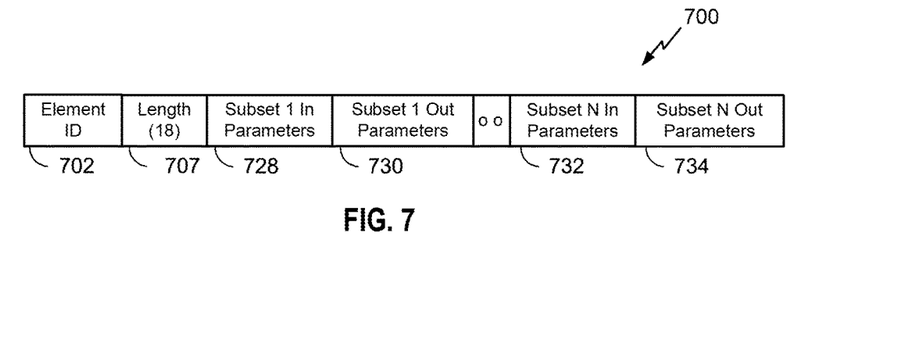
FIG. 7 illustrates another exemplary implementation of an EDCA parameter set element.

FIG. 7 illustrates another exemplary implementation of an EDCA parameter set element 700. The EDCA parameter set element 700 of FIG. 7 may be substantially the same as the EDCA parameter set element 400 of FIG. 4 with the exception that instead of a single channel access parameter field for each subset, e.g., fields 418 and 420, the element 700 includes and communicates two channel access parameter fields for each subset of HE wireless devices provided in a predetermined order, e.g., subset inside channel access parameter field 728 and subset outside channel access parameter field 730, indicating different channel access parameters for the HE wireless devices in a first subset to utilize inside an HE-reserved period of a beacon interval (e.g., during a predetermined time period) and outside the HE-reserved period of the beacon interval (e.g., outside the predetermined time period), respectively. Likewise, the element 700 may additionally include inside channel access parameter fields and outside channel access parameter fields for each of other subsets, e.g., $N^{th}$ subset inside channel access parameter field 732 and $N^{th}$ subset outside channel access parameter field 734.

Thus, in reference to FIG. 1, the AP 104 may broadcast the EDCA parameter set element 700 including an element ID in the element ID field 702 that is identifiable or decodable by all of the HE wireless devices 106a-106i within subsets 110a, 110b and 110c of the first group of wireless devices 108a. The wireless devices 106j-106m in the second group of wireless devices 108d are legacy wireless devices and so will not be capable of identifying the element ID in the element ID field 702. As previously described for FIG. 4, the EDCA parameter set element 700 may include a length field 704. The EDCA parameter set element 700 may also include a subset inside channel access parameter field 728, a first subset outside channel access parameter field 730, a second subset inside channel access parameter field (not shown), a second subset outside channel access parameter field (not shown), an $N^{th}$ subset inside channel access parameter field 732, and an $N^{th}$ subset outside channel access parameter field 734 which may correspond to a $3^{rd}$ subset inside and outside channel access parameter fields, respectively, in this example. Since the channel access parameter fields are provided in a predetermined order, the HE wireless devices 106a-106c of the subset 110a may receive the EDCA parameter set element 700 and read the channel access parameters from the first subset inside and outside channel access parameter fields 728 and 730 and update their channel access parameters accordingly. Likewise, the HE wireless devices 106d-106f of the subset 110b may receive the EDCA parameter set element 700 and read the channel access parameters from the second subset inside and outside channel access parameter fields (not shown) and update their channel access parameters accordingly. Similarly, the HE wireless devices 106g-106i of the subset 110c may receive the EDCA parameter set element 700 and read the channel access parameters from the $N^{th}$ subset inside and outside channel access parameter fields 732 and 734 and update their channel access parameters accordingly. The wireless devices 106a-106i of the subsets 110a-110c of the first group of wireless devices 108a set their channel access parameters to the respective values in the EDCA parameter set element 700 and utilize the values in their respective inside or outside parameter fields. The corresponding values are used by the HE wireless devices 106a-106i based on whether they are communicating inside or outside the HE-reserved periods of a particular beacon interval (e.g., during or outside the predetermined time period).

Figure 8:
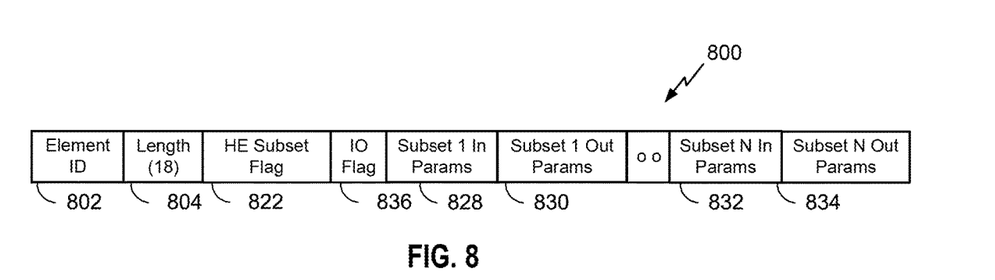
FIG. 8 illustrates another exemplary implementation of an EDCA parameter set element.

FIG. 8 illustrates another exemplary implementation of an EDCA parameter set element 800. The EDCA parameter set element 800 of FIG. 8 may be substantially the same as the EDCA parameter set element 500 of FIG. 5, including a length field 804. The element 800 includes and communicates up to two EDCA parameter fields for each subset of HE wireless devices by including an inside-and-outside outside (IO) flag field. For example, as described previously in connection with FIG. 5, EDCA parameter set element 800 may include an HE subset flag field 822 including multiple flag bits, each of the flag bits indicating the presence of inside, or outside, or inside and outside channel access parameter fields corresponding to a particular subset of HE wireless devices. After the HE subset flag field 822, the IO flag field 836 may also be provided to include for example two flag bits to indicate the presence of the inside, or the outside, or both the inside and outside channel access parameter fields. For example, the IO flag field 836 may have a value of "10" indicating the presence of only inside channel access parameter fields, a value of "01" indicating the presence of only outside channel access parameter fields, and a value "11" indicating the presence of both inside and outside channel access parameter fields. The EDCA parameter set element 800 may include the inside and/or outside channel access parameter fields for each subset of wireless devices indicated in the HE subset flag field 822.

Thus, in reference to FIG. 1, the AP 104 may broadcast the EDCA parameter set element 800 including an element ID in the element ID field 802 that is identifiable or decodable by all of the HE wireless devices 106a-106i within subsets 110a, 110b and 110c of the first group of wireless devices 108a. The wireless devices 106j-106m in the second group of wireless devices 108d are legacy wireless devices and so will not be capable of identifying the element ID in the element ID field 802. The HE subset flag field 822 may include values to indicate which subsets of HE wireless devices will have corresponding channel access parameter fields present in the EDCA parameter set element 800. In addition, the IO flag field 836 may include the value "11" to indicate that both inside and outside channel access parameter fields and associated parameters will be present for each subset of wireless devices indicated in the HE subset flag field 822. As such, when the bit value for subset 110a has been set, the HE wireless devices 106a-106c may receive the EDCA parameter set element 800 and read the channel access parameters from the first subset inside and outside channel access parameter fields 828 and 830 and update their channel access parameters accordingly. Likewise, when the bit value for subset 110b has been set, the HE wireless devices 106d-106f may receive the EDCA parameter set element 800 and read the channel access parameters from the second subset inside and outside channel access parameter fields (not shown) and update their channel access parameters accordingly. Similarly, when the bit value for subset 110c has been set, the HE wireless devices 106g-106i may receive the EDCA parameter set element 800 and read the channel access parameters from the $N^{th}$ subset inside and outside channel access parameter fields 832 and 834 and update their channel access parameters accordingly. Therefore, the HE wireless devices 106a-106i of the subsets 110a-110c set their channel access parameters to the respective values in the EDCA parameter set element 800 and utilize the parameter values in the inside or outside fields based on whether the HE wireless devices 106a-106i are communicating inside or outside the HE-reserved periods of a particular beacon interval (e.g., during or outside the predetermined time period).

Figure 9:
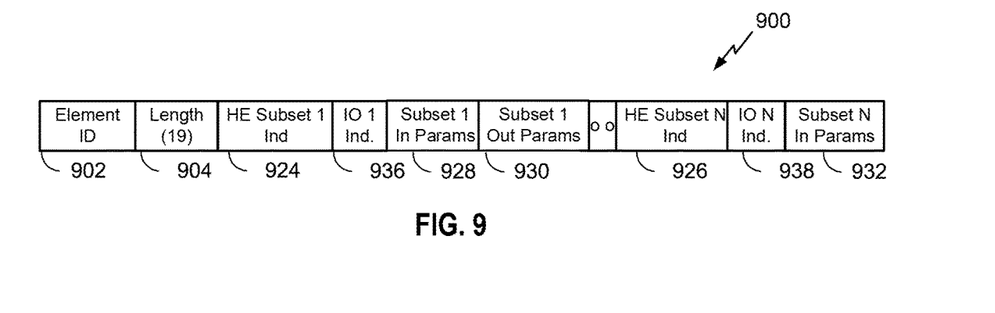
FIG. 9 illustrates another exemplary implementation of an EDCA parameter set element.

FIG. 9 illustrates another exemplary implementation of an EDCA parameter set element 900. The EDCA parameter set element 900 of FIG. 9 may be substantially the same as the EDCA parameter set element 600 of FIG. 6, including a length element 904. The EDCA parameter set element 900 includes and communicates up to two channel access parameter fields for each subset of HE wireless devices as indicated individually for each subset of HE wireless devices by a respective inside-and-outside (IO) indicator field. For example, as described previously in connection with FIG. 6, the EDCA parameter set element 900 of FIG. 9 may include only channel access parameters for subsets of HE wireless devices requiring updating or setting their channel access parameters. The channel access parameter fields may be provided in any order by including an HE subset indicator field 924/926 before the corresponding channel access parameter fields. However, as compared to EDCA parameter set element 600 of FIG. 6, the EDCA parameter set element 900 of FIG. 9 may additionally include an IO subset indicator field 936/938 immediately following each respective HE subset indicator field 924/926. The operation based on the bits of the IO subset indicator fields 936/938 may be substantially similar to the operation of the bits of the IO flag field 836 previously described in connection with FIG. 8, except that the IO subset indicator fields 924/926 correspond only to the presence of inside or outside channel access parameter fields for the HE wireless device subset indicated by the immediately preceding HE subset indicator field (e.g., 924 and 926). Thus, an HE wireless device receiving the EDCA parameter set element 900 may determine based on the HE subset indicator fields which subsets of HE wireless devices have a corresponding channel access parameter field. Furthermore for each subset that is present in the EDCA parameter set element 900, the receiving wireless device is able to determine, based on the following respective IO indicator field, whether inside, or outside, or both inside and outside channel access parameter fields are present. In reference to FIG. 1, the AP 104 may broadcast the EDCA parameter set element 900 including an element ID in the element ID field 902 that is identifiable or decodable by all of the HE wireless devices 106a-106i within the subsets 110a, 110b and 110c of the first group of wireless devices 108a. The wireless devices 106j-106m in the second group of wireless devices 108d are legacy wireless devices and so will not be capable of identifying the element ID in the element ID field 902. The HE subset indicator fields 924/926 may include values to indicate which subsets of HE wireless devices will have corresponding channel access parameter fields present in the EDCA parameter set element 900. In addition, the IO indicator field 936, corresponding to the first HE subset indicator field 924, may include the value "11" to indicate that both inside and outside channel access parameters are present for the first subset of wireless devices indicated in the HE subset flag field 924. Similarly, the IO indicator field 938, corresponding to the $N^{th}$ HE subset indicator field 926, may include the value "10" to indicate that only the inside channel access parameter field are present for the $N^{th}$ subset of wireless devices indicated in HE subset indicator field 926. The HE wireless devices 106a-106c of subset 110a may receive the EDCA parameter set element 900 and read the channel access parameters from the first subset inside and outside channel access parameter fields 928 and 930 and update their channel access parameters accordingly. Likewise, the HE wireless devices 106g-106i of the subset 110c may receive the EDCA parameter set element 900 and read the channel access parameters from the $N^{th}$ subset inside channel access parameter field 932 and update their inside channel access parameters accordingly.

Various aspects described in connection with FIGS. 3-9 may be utilized where the EDCA parameter set elements 300-900 are transmitted in a broadcast to wireless devices in the basic service set for the broadcasting device. Transmitting in a broadcast manner may be useful when all the HE wireless devices may be grouped into, for example, the first group of wireless devices. However, EDCA parameters may need to be transmitted in a multicast to particular HE wireless devices. Considering a condition where the HE devices need to be grouped into multiple groups. The description associated with the FIGS. 3-9 is provided while grouping the HE devices into the first group and the legacy devices into a second group of wireless devices. As described, the transmission is also received by the legacy devices, the second group of wireless devices 108d. However, the number of HE wireless devices may be too large, and it may be necessary to group them into multiple groups. Generally, transmitting in a multicast may include transmitting a message to a plurality of wireless devices that are identified by a common multicast address.

Figure 10:
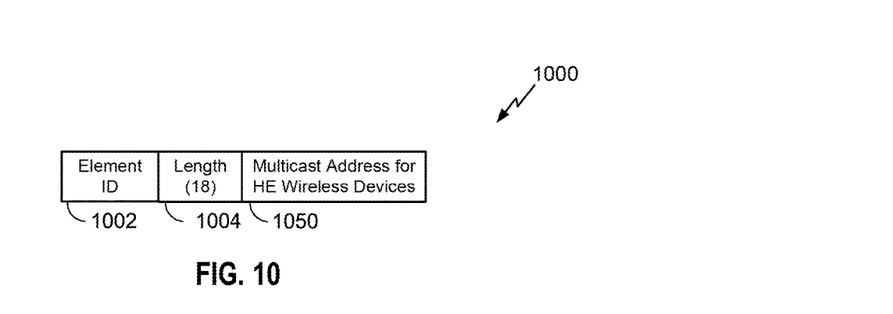
FIG. 10 illustrates an exemplary implementation of a multicast address per EDCA subset element.

FIG. 10 illustrates an exemplary implementation of a multicast address per EDCA subset element 1000. The channel access parameters may be transmitted in an EDCA parameter set element, as previously described in connection with any of FIGS. 3-9. In addition, the multicast address that identifies the HE wireless devices in a multicast frame may be defined in the multicast address per EDCA subset element 1000, which may be transmitted in another management frame, for example, a beacon, or probe/association response, than the EDCA parameter set elements 300-900. The multicast address per EDCA subset element 1000 may include an element ID field 1002, a length field 1004, and a multicast address field 1050. The multicast address field 1050 may indicate each of the HE wireless devices to which the particular multicast address per EDCA subset element 1000 is addressed. The multicast address per EDCA subset element 1000 may be utilized where all HE wireless devices to which the multicast frame is addressed will share the same EDCA parameters. The multicast address per EDCA subset element 1000 essentially would define the members of the first group of the wireless stations 108a. The multicast address per EDCA subset element 1000 may be transmitted just before or essentially at about the same time as the transmission of the EDCA parameter set element, as previously described in connection with any of FIGS. 3-9.

Figure 11:
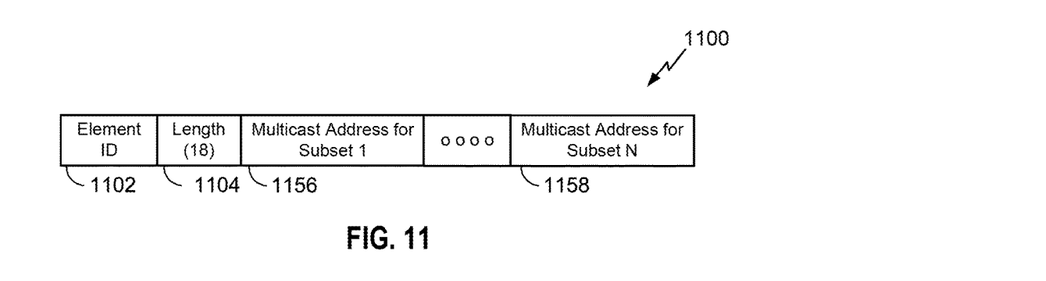
FIG. 11 illustrates another exemplary implementation of a multicast address per EDCA subset element.

FIG. 11 illustrates another exemplary implementation of a multicast address per EDCA subset element 1100. A multicast address is present for each subset of all the subsets of HE wireless device in a predetermined order. The multicast address per EDCA subset element 1100 may include an element ID field 1102, a length field 1104 and a multicast address field for each subset of HE wireless devices identifying the wireless devices in each subset. Each of the multicast address fields indicates a multicast address of the HE wireless devices in each of the corresponding subsets of wireless devices. The first subset multicast address field 1156 through the $N^{th}$ subset multicast address field 1158 may be present in the multicast address per EDCA subset element 1100. Each address field includes a respective multicast address corresponding to the HE wireless devices in that particular subset. For example, a first multicast address may correspond to the subset 110a including the HE wireless devices 106a-106c, a second multicast address may correspond to the subset 110b including the HE wireless devices 106d-106f, and a third multicast address may correspond to the subset 110c including the HE wireless devices 106g-106i, as shown in FIG. 1.

Figure 12:
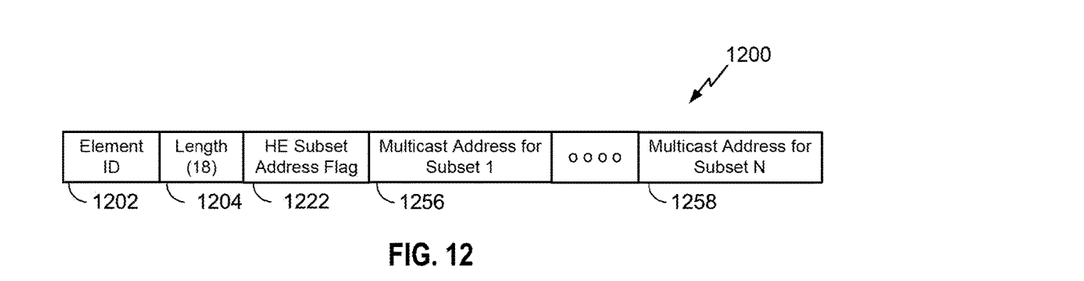
FIG. 12 illustrates another exemplary implementation of a multicast address per EDCA subset element.

FIG. 12 illustrates another exemplary implementation of a multicast address per EDCA subset element 1200. The element 1200 may include an element ID field 1202, a length field 1204, a HE subset address flag field 1222, and a multicast address field for each HE subset indicated by the HE subset address flag field 1222. The multicast addresses are present for only those HE wireless device subsets indicated by a single HE subset address flag field 1222 in the multicast address per EDCA subset element 1200. The HE subset address flag field 1222 may include multiple flag bits to indicate the presence of a corresponding subset in the multicast address per EDCA subset element 1200. For example, if the HE subset address flag field 1222 indicates the presence of a multicast address field for each of a first subset through an $N^{th}$ subset, corresponding multicast address fields 1256/1258, for example, will be present, one for each of subsets 1 through N. Each of the multicast address fields 1256/1258 may include a respective multicast address that corresponds to the HE wireless devices in that particular subset. For example, a first multicast address may correspond to the HE wireless devices 106a-106c in subset 110a, a second multicast address (not shown) may correspond to the HE wireless devices 106d-106f in the subset 110b, and a third multicast address (e.g. 1258) may correspond to the HE wireless devices 106g-106i in subset 110c, as shown in FIG. 1.

Figure 13:
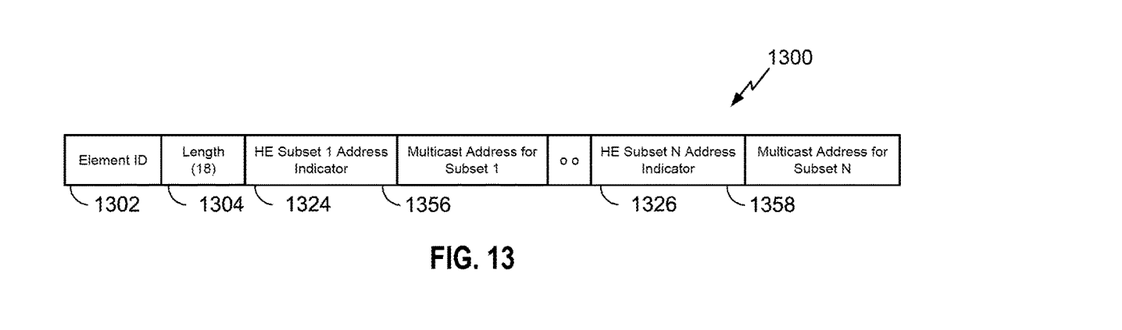
FIG. 13 illustrates another exemplary implementation of a multicast address per EDCA subset element.

FIG. 13 illustrates another exemplary implementation of a multicast address per EDCA subset element 1300. A respective multicast address is present along with a corresponding HE subset address indicator field, as shown in FIG. 13. The multicast address per EDCA subset element 1300 may include an element ID field 1302, a length field 1304, one or more HE subset address indicator fields, for example subset address indicator fields 1324 and 1326, and one or more multicast address fields each corresponding to a respective one of the HE subset address indicator fields, for example multicast address fields 1356 and 1358. Each multicast address field 1356/1358 includes a multicast address corresponding to the HE wireless devices in each associated subset. For example, if the HE subset address indicator field 1324 indicates the presence of a corresponding multicast address field, the multicast address field 1356 will be present immediately before or immediately after the HE subset address indicator field 1324 (shown as occurring after the HE subset address indicator field 1324). Likewise, if another HE subset address indicator field 1326 indicates the presence of a corresponding multicast address field, the multicast address field 1358 will be present immediately before or immediately after the HE subset address indicator field 1326 (shown as occurring after the HE subset address indicator field 1326). As shown in FIG. 13, each HE subset address indicator field may indicate the presence of a corresponding multicast address field in the multicast address per EDCA subset element 1300.

Figure 14:
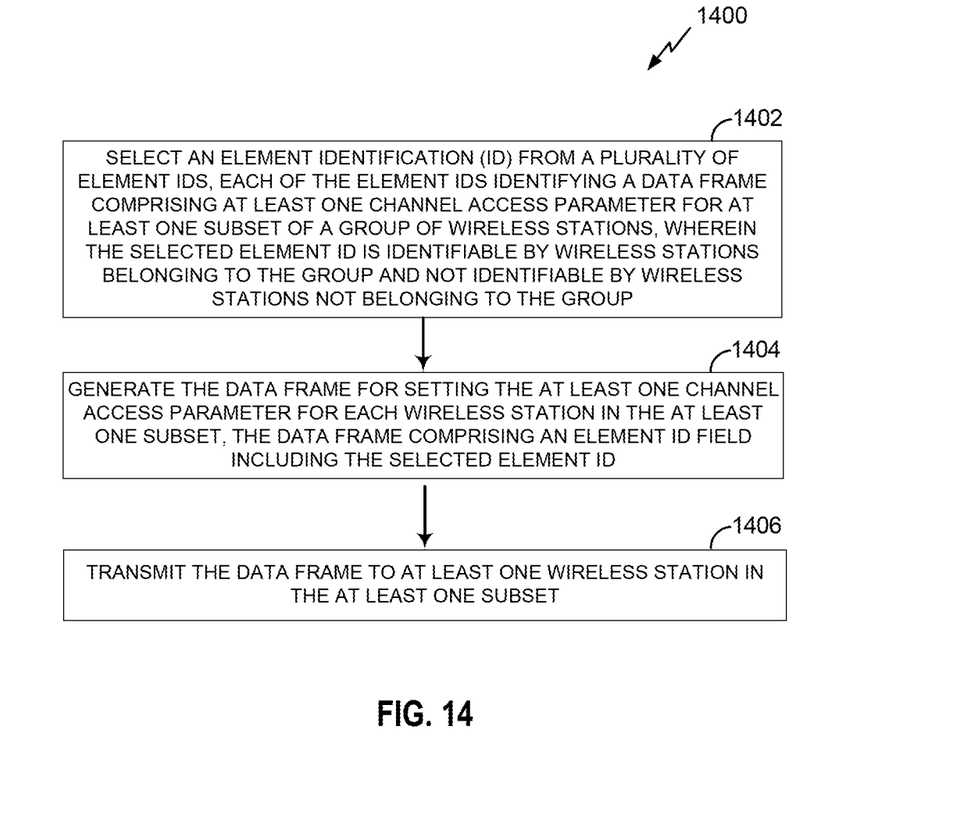
FIG. 14 shows a flow chart of an exemplary implementation of a process of wireless communication in a wireless communication system.

FIG. 14 shows a flow chart of an implementation of a process 1400 of wireless communication in a wireless communication system. The process 1400 may be used to generate and transmit any of the EDCA parameter set element elements 300-900 described in connection with FIGS. 3-9. The EDCA parameter set element may be transmitted by the AP 104. In addition, the wireless device 202 shown in FIG. 2 may represent a more detailed view of the AP 104, as described above. Thus, in one implementation, one or more of the steps in process 1400 may be performed by, or in connection with, a processor and/or transmitter, such as the processor 204 and transmitter 210 of FIG. 2, although those having ordinary skill in the art will appreciate that other components may be used to implement one or more of the steps described herein. Although the process steps may be described as occurring in a certain order, the steps can be reordered, omitted, and/or additional steps may be added.

At step 1402, the process 1400 may include selecting an element identification (ID) from a plurality of element IDs, each of the plurality of element IDs identifying an EDCA parameter set element comprising at least one channel access parameter for at least one subset of wireless devices in a group of wireless devices. The selected element ID is identifiable by wireless devices of the group of wireless devices and not identifiable by other wireless devices. For example, the AP 104 may select an element ID that can be identified by HE wireless devices, such as one or more of the wireless devices 106a-106i (e.g., any of the subsets 110a-110c of the first group of wireless devices 108a), but not by legacy wireless devices, such as the wireless devices 106j-106m (e.g., the second group 108b and not part of the first group 108a). Such selecting may be performed by the processor 204 of the wireless device 202 shown in FIG. 2. Process 1400 may then advance to step 1404.

At step 1404, the process 1400 may include generating the EDCA parameter set element for setting the at least one channel access parameter for each wireless device in the at least one subset of wireless devices. The EDCA parameter set element includes the selected element ID. For example, the AP 104 may generate an EDCA parameter set element as previously described in connection with any of FIGS. 3-9. Such generating may be performed by the processor 204 of the wireless device 202 shown in FIG. 2. The process 1400 may then advance to step 1406.

At step 1406, the process 1400 may include transmitting the EDCA parameter set element to at least one wireless device in the at least one subset of wireless devices. For example, the AP 104 may transmit the generated EDCA parameter set element of any one of FIGS. 3-9 to any or all of the HE wireless devices 106a-106i (e.g., the appropriate subset(s) 110a-110c of the first group 108a) as shown in FIG. 1. Such transmitting may be performed by the transmitter 210 of the wireless device 202 shown in FIG. 2. The process for generating and transmitting the multicast address per EDCA subset shown in connection with the FIGS. 10, 11, 12 and 13 may be similar and includes transmitting the multicast address per EDCA subsets respectively.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for configuring channel access parameters in a wireless communication system, the method comprising:
   identifying a first subset of wireless devices and one or more additional subsets of wireless devices in a group of wireless devices, each wireless device of the first subset of wireless devices having a first performance characteristic, and each of the one or more additional subsets of wireless devices having a respective performance characteristic;
   generating a channel access parameter set element including a first parameter value in a first parameter field for the first subset of wireless devices, and including a respective parameter value in a respective parameter field for each of the one or more additional subsets of wireless devices; and
   transmitting the channel access parameter set element to at least one wireless device of each of the subsets of wireless devices, the transmitting being for setting the first parameter value at each wireless device of the first subset of wireless devices, and the transmitting further being for setting each of the respective parameter values at each wireless device of the respective one or more additional subsets of wireless devices,
   wherein the first performance characteristic and the respective performance characteristics are channel access characteristics, and wherein generating the channel access parameter set element further comprises generating identification information in an identification field of the channel access parameter set element, the identification information being identifiable by one or more of the subsets of wireless devices based on one or more of the first subset of wireless devices having the first performance characteristic and each of the one or more additional subsets of wireless devices having the respective performance characteristic.

2. The method of claim 1, wherein each of the parameter fields are generated in a predetermined order, and wherein generating the channel access parameter set element further comprises generating a subset flag field in the channel access parameter set element, the subset flag field comprising a plurality of bits for indicating a presence of each of the parameter fields.

3. The method of claim 2, further comprising generating a subset indicator field before each of the parameter fields, each of the subset indicator fields indicating a respective one of the subsets of wireless devices that corresponds to an immediately following parameter field.

4. The method of claim 1, wherein generating the channel access parameter set element further comprises generating at least one of:
   an inside parameter field corresponding to and for use by a respective subset of the group of wireless devices during a predetermined time period;
   an outside parameter field corresponding to and for use by the respective subset of the group of wireless devices outside the predetermined time period; and
   at least one inside-and-outside flag field comprising a plurality of bits for indicating a presence of one or both of the inside and the outside parameter fields for each of the subsets of the group of wireless devices or for a corresponding subset of the group of wireless devices.

5. The method of claim 1, further comprising:
   generating a multicast address corresponding to each subset of the group of wireless devices; and
   transmitting each of the multicast addresses in the channel access parameter set element in association with the respective subset of the group of wireless devices.

6. The method of claim 5, wherein generating the multicast address for each subset of the group of wireless devices comprises:
   generating a plurality of multicast address fields in a predetermined order, each of the plurality of multicast address fields comprising the multicast address corresponding to the respective subset of the group of wireless devices; and
   generating a subset address flag field comprising a plurality of bits for indicating a presence of at least one of the plurality of multicast address fields.

7. The method of claim 1, wherein transmitting the channel access parameter set element further comprises broadcasting the channel access parameter set element to all wireless devices in the wireless communication system.

8. An apparatus for configuring channel access parameters in a wireless communication system, the apparatus comprising:
   a processor configured to:
      identify a first subset of wireless devices and one or more additional subsets of wireless devices in a group of wireless devices, each wireless device of the first subset of wireless devices having a first performance characteristic, and each of the one or more additional subsets of wireless devices having a respective performance characteristic; and
      generate a channel access parameter set element including a first parameter value in a first parameter field for the first subset of wireless devices, and including a respective parameter value in a respective parameter field for each of the one or more additional subsets of wireless devices; and
   a transmitter configured to transmit the channel access parameter set element to at least one wireless device of each of the subsets of wireless devices, the transmit being for setting the first parameter value at each wireless device of the first subset of wireless devices, and the transmit further being for setting each of the respective parameter values at each wireless device of the respective one or more additional subsets of wireless devices, wherein the first performance characteristic and the respective performance characteristics are channel access characteristics, and wherein the processor generating the channel access parameter set element further comprises the processor generating identification information in an identification field of the channel access parameter set element, the identification information being identifiable by one or more of the subsets of wireless devices based on one or more of the first subset of wireless devices having the first performance characteristic and each of the one or more additional subsets of wireless devices having the respective performance characteristic.

9. The apparatus of claim 8, the processor being further configured to generate each of the parameter fields in a predetermined order, and wherein the processor generating the channel access parameter set element further comprises the processor generating a subset flag field in the channel access parameter set element, the subset flag field comprising a plurality of bits for indicating a presence of each of the parameter fields.

10. The apparatus of claim 9, the processor being further configured to generate a subset indicator field before each of the parameter fields, each of the subset indicator fields indicating a respective one of the subsets of wireless devices that corresponds to an immediately following parameter field.

11. The apparatus of claim 8, wherein the processor generating the channel access parameter set element further comprises the processor generating at least one of:
an inside parameter field corresponding to and for use by a respective subset of the group of wireless devices during a predetermined time period;
an outside parameter field corresponding to and for use by the respective subset of the group of wireless devices outside the predetermined time period; and
at least one inside-and-outside flag field comprising a plurality of bits for indicating a presence of one or both of the inside and the outside parameter fields for each of the subsets of the group of wireless devices or for a corresponding subset of the group of wireless devices.

12. The apparatus of claim 8, the processor being further configured to:
generate a multicast address corresponding to each subset of the group of wireless devices; and
transmit each of the multicast addresses in the channel access parameter set element in association with the respective subset of the group of wireless devices.

13. The apparatus of claim 12, wherein the processor generating the multicast address for each subset of the group of wireless devices comprises the processor being further configured to:
generate a plurality of multicast address fields in a predetermined order, each of the plurality of multicast address fields comprising the multicast address corresponding to the respective subset of the group of wireless devices; and
generate a subset address flag field comprising a plurality of bits for indicating a presence of at least one of the plurality of multicast address fields.

14. The apparatus of claim 8, wherein the processor transmitting the channel access parameter set element further comprises the processor broadcasting the channel access parameter set element to all wireless devices in the wireless communication system.

15. A non-transitory computer-readable medium comprising code, that when executed, causes an apparatus for configuring channel access parameters in a wireless communication system to perform a method comprising:
identifying a first subset of wireless devices and one or more additional subsets of wireless devices in a group of wireless devices, each wireless device of the first subset of wireless devices having a first performance characteristic, and each of the one or more additional subsets of wireless devices having a respective performance characteristic;
generating a channel access parameter set element including a first parameter value in a first parameter field for the first subset of wireless devices, and including a respective parameter value in a respective parameter field for each of the one or more additional subsets of wireless devices; and
transmitting the channel access parameter set element to at least one wireless device of each of the subsets of wireless devices, the transmitting being for setting the first parameter value at each wireless device of the first subset of wireless devices, and the transmitting further being for setting each of the respective parameter values at each wireless device of the respective one or more additional subsets of wireless devices,
wherein the first performance characteristic and the respective performance characteristics are channel access characteristics, and wherein generating the channel access parameter set element further comprises generating identification information in an identification field of the channel access parameter set element, the identification information being identifiable by one or more of the subsets of wireless devices based on one or more of the first subset of wireless devices having the first performance characteristic and each of the one or more additional subsets of wireless devices having the respective performance characteristic.

16. The medium of claim 15, wherein each of the parameter fields are generated in a predetermined order, wherein generating the channel access parameter set element further comprises generating a subset flag field in the channel access parameter set element, the subset flag field comprising a plurality of bits for indicating a presence of each of the parameter fields, and wherein the method further comprises generating a subset indicator field before each of the parameter fields, each of the subset indicator fields indicating a respective one of the subsets of wireless devices that corresponds to an immediately following parameter field.

17. The medium of claim 15, wherein generating the channel access parameter set element further comprises generating at least one of:
an inside parameter field corresponding to and for use by a respective subset of the group of wireless devices during a predetermined time period;
an outside parameter field corresponding to and for use by the respective subset of the group of wireless devices outside the predetermined time period; and
at least one inside-and-outside flag field comprising a plurality of bits for indicating a presence of one or both of the inside and the outside parameter fields for each of the subsets of the group of wireless devices or for a corresponding subset of the group of wireless devices.

18. The medium of claim 15, the method further comprising:
- generating a multicast address corresponding to each subset of the group of wireless devices; and
- transmitting each of the multicast addresses in the channel access parameter set element in association with the respective subset of the group of wireless devices.

19. The medium of claim 18, wherein generating the multicast address for each subset of the group of wireless devices comprises:
- generating a plurality of multicast address fields in a predetermined order, each of the plurality of multicast address fields comprising the multicast address corresponding to the respective subset of the group of wireless devices; and
- generating a subset address flag field comprising a plurality of bits for indicating a presence of at least one of the plurality of multicast address fields.

20. The medium of claim 15, wherein transmitting the channel access parameter set element further comprises broadcasting the channel access parameter set element to all wireless devices in the wireless communication system.

21. An apparatus for configuring channel access parameters in a wireless communication system, the apparatus comprising:
- means for identifying a first subset of wireless devices and one or more additional subsets of wireless devices in a group of wireless devices, each wireless device of the first subset of wireless devices having a first performance characteristic, and each of the one or more additional subsets of wireless devices having a respective performance characteristic;
- means for generating a channel access parameter set element including a first parameter value in a first parameter field for the first subset of wireless devices, and including a respective parameter value in a respective parameter field for each of the one or more additional subsets of wireless devices; and
- means for transmitting the channel access parameter set element to at least one wireless device of each of the subsets of wireless devices, the transmitting being for setting the first parameter value at each wireless device of the first subset of wireless devices, and the transmitting further being for setting each of the respective parameter values at each wireless device of the respective one or more additional subsets of wireless devices,
- wherein the first performance characteristic and the respective performance characteristics are channel access characteristics, and wherein generating the channel access parameter set element further comprises means for generating identification information in an identification field of the channel access parameter set element, the identification information being identifiable by one or more of the subsets of wireless devices based on one or more of the first subset of wireless devices having the first performance characteristic and each of the one or more additional subsets of wireless devices having the respective performance characteristic.

22. The apparatus of claim 21, wherein each of the parameter fields are generated in a predetermined order, wherein the means for generating the channel access parameter set element further comprises means for generating a subset flag field in the channel access parameter set element, the subset flag field comprising a plurality of bits for indicating a presence of each of the parameter fields, and the apparatus further comprising means for generating a subset indicator field before each of the parameter fields, each of the subset indicator fields indicating a respective one of the subsets of wireless devices that corresponds to an immediately following parameter field.

23. The apparatus of claim 21, wherein the means for generating the channel access parameter set element further comprises means for generating at least one of:
- an inside parameter field corresponding to and for use by a respective subset of the group of wireless devices during a predetermined time period;
- an outside parameter field corresponding to and for use by the respective subset of the group of wireless devices outside the predetermined time period; and
- at least one inside-and-outside flag field comprising a plurality of bits for indicating a presence of one or both of the inside and the outside parameter fields for each of the subsets of the group of wireless devices or for a corresponding subset of the group of wireless devices.

24. The apparatus of claim 21, further comprising:
- means for generating a multicast address corresponding to each subset of the group of wireless devices; and
- means for transmitting each of the multicast addresses in the channel access parameter set element in association with the respective subset of the group of wireless devices.

25. The apparatus of claim 24, wherein the means for generating the multicast address for each subset of the group of wireless devices further comprises:
- means for generating a plurality of multicast address fields in a predetermined order, each of the plurality of multicast address fields comprising the multicast address corresponding to the respective subset of the group of wireless devices; and
- means for generating a subset address flag field comprising a plurality of bits for indicating a presence of at least one of the plurality of multicast address fields.

26. The apparatus of claim 21, wherein the means for transmitting the channel access parameter set element further comprises means for broadcasting the channel access parameter set element to all wireless devices in the wireless communication system.

* * * * *